United States Patent
Tsiouvaras et al.

(10) Patent No.: US 10,686,219 B2
(45) Date of Patent: Jun. 16, 2020

(54) LITHIUM CELL AND BATTERY CONTAINING AN ELECTROLYTE GEL

(71) Applicant: Bayerische Motoren Werke Aktiengesellschaft, Munich (DE)

(72) Inventors: Nikolaos Tsiouvaras, Munich (DE); Hideki Ogihara, Haimhausen (DE); Thomas Woehrle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 473 days.

(21) Appl. No.: 15/293,683

(22) Filed: Oct. 14, 2016

(65) Prior Publication Data

US 2017/0033401 A1    Feb. 2, 2017

Related U.S. Application Data

(63) Continuation of application No. PCT/EP2015/055386, filed on Mar. 16, 2015.

(30) Foreign Application Priority Data

Apr. 15, 2014  (DE) .................. 10 2014 207 233

(51) Int. Cl.
*H01M 6/14* (2006.01)
*H01M 10/0565* (2010.01)
(Continued)

(52) U.S. Cl.
CPC ....... *H01M 10/0565* (2013.01); *H01M 2/162* (2013.01); *H01M 2/1626* (2013.01);
(Continued)

(58) Field of Classification Search
CPC ............ H01M 2/162; H01M 2/1626; H01M 10/0565; H01M 10/052; H01M 10/0525;
(Continued)

(56) References Cited

U.S. PATENT DOCUMENTS

| 5,942,354 A | 8/1999 | Oxley et al. |
| 6,395,428 B1 * | 5/2002 | Kezuka ................ H01M 6/22 |
| | | 429/300 |

(Continued)

FOREIGN PATENT DOCUMENTS

| CN | 1258109 A | 6/2000 |
| DE | 36 03 196 A1 | 8/1987 |

(Continued)

OTHER PUBLICATIONS

International Search Report (PCT/ISA/210) issued in PCT Application No. PCT/EP2015/055386 dated Jun. 15, 2015 with English translation (five pages).

(Continued)

*Primary Examiner* — Raymond Alejandro
(74) *Attorney, Agent, or Firm* — Crowell & Moring LLP

(57) ABSTRACT

A lithium cell is provided having an anode, a cathode, and an electrolyte gel which is located at least between the anode and the cathode and contains a lithium ion conducting salt solution. The electrolyte gel contains fibers which can be crosslinked using the lithium ion conducting salt solution and which have a surface tension of at least 30 mN/m. The lithium cell has an increased mechanical and thermal stability.

15 Claims, 1 Drawing Sheet

(51) Int. Cl.
*H01M 2/16* (2006.01)
*H01M 10/052* (2010.01)
*H01M 10/0569* (2010.01)
*H01M 10/0568* (2010.01)
*H01M 10/0525* (2010.01)

(52) U.S. Cl.
CPC ..... *H01M 10/052* (2013.01); *H01M 10/0525* (2013.01); *H01M 10/0568* (2013.01); *H01M 10/0569* (2013.01); *H01M 2220/10* (2013.01); *H01M 2220/20* (2013.01); *H01M 2220/30* (2013.01); *H01M 2300/0025* (2013.01); *H01M 2300/0045* (2013.01); *H01M 2300/0082* (2013.01); *H01M 2300/0085* (2013.01); *Y02E 60/122* (2013.01); *Y02T 10/7011* (2013.01)

(58) Field of Classification Search
CPC ......... H01M 10/0568; H01M 10/0569; H01M 2220/10; H01M 2220/20; H01M 2220/30; H01M 2300/0025; H01M 2300/0045; H01M 2300/0082; H01M 2300/0085; Y02E 60/122; Y02T 10/7011
See application file for complete search history.

(56) References Cited

U.S. PATENT DOCUMENTS

2013/0327702 A1* 12/2013 Wu .................... B01D 69/10
                                                                210/499

2014/0212727 A1    7/2014 Hying et al.

FOREIGN PATENT DOCUMENTS

| DE | 198 55 644 A1 | 6/1999 |
| DE | 699 23 149 T2 | 12/2005 |
| DE | 10 2005 042 215 A1 | 3/2007 |
| EP | 0 877 432 A2 | 11/1998 |
| EP | 1 005 099 A1 | 5/2000 |

OTHER PUBLICATIONS

German-language Written Opinion (PCT/ISA/237) issued in PCT Application No. PCT/EP2015/055386 dated Jun. 15, 2015 (six pages).

German Search Report issued in counterpart German Application No. 10 2014 207 233.6 dated Dec. 11, 2014 with partial English translation (13 pages).

English translation of Chinese Office Action issued in counterpart Chinese Application No. 201580019504.0 dated Mar. 15, 2018 (eight (8) pages).

English translation of Chinese Office Action issued in counterpart Chinese Application No. 201580019504 dated Oct. 29, 2018 (nine (9) pages).

\* cited by examiner

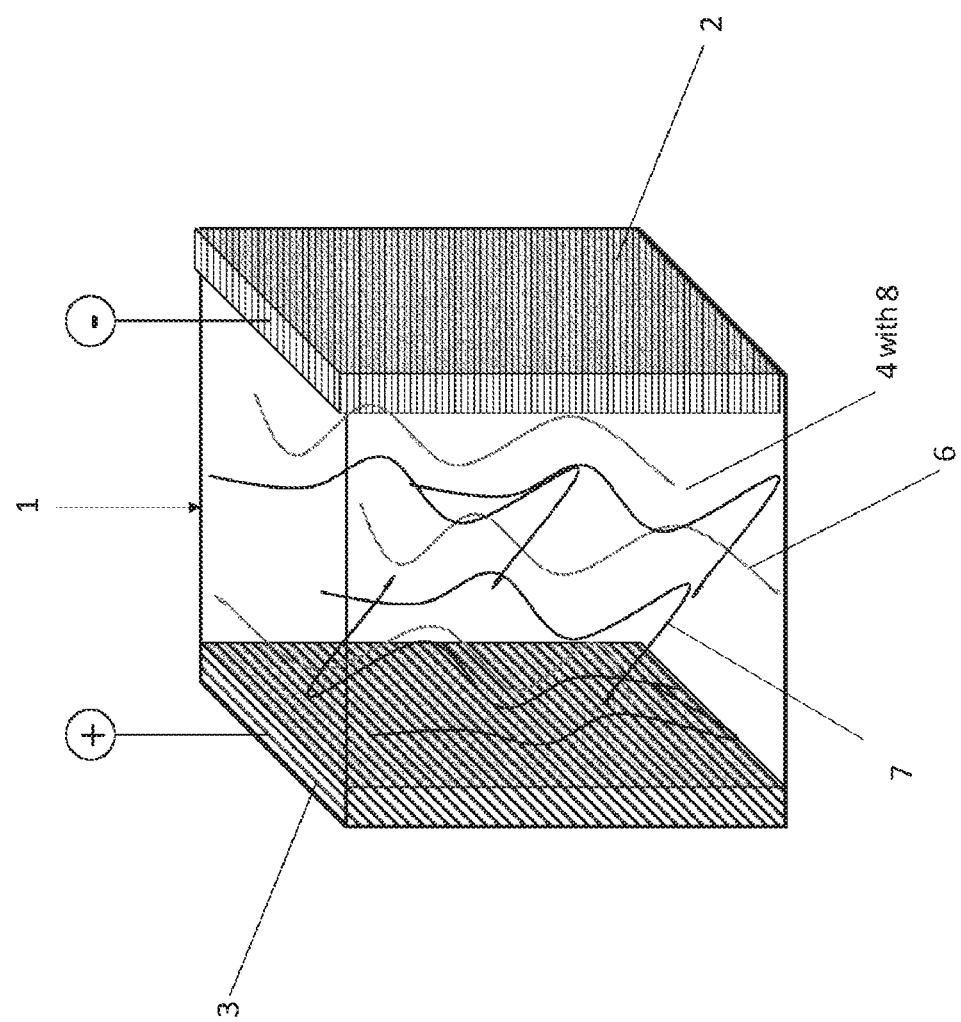

LITHIUM CELL AND BATTERY CONTAINING AN ELECTROLYTE GEL

CROSS REFERENCE TO RELATED APPLICATIONS

This application is a continuation of PCT International Application No. PCT/EP2015/055386, filed Mar. 16, 2015, which claims priority under 35 U.S.C. § 119 from German Patent Application No. 10 2014 207 233.6, filed Apr. 15, 2014, the entire disclosures of which are herein expressly incorporated by reference.

BACKGROUND OF THE INVENTION

The invention relates to a lithium cell, a battery comprising the lithium cell, and motor vehicle, mobile device, or stationary storage element comprising said battery.

Lithium cells are used with ever-increasing frequency in numerous applications as energy storage means particularly because of their high energy density/specific energy and their long service life and low self-discharge losses. For example lithium cells are already employed as batteries in motor vehicles, in particular as energy storage means in electric cars, in particular as accumulators in mobile electronic devices and in stationary storage means.

As used herein, the term "lithium cells" is understood to mean for example rechargeable lithium accumulators (secondary cells) or primary non-rechargeable lithium cells. In particular, lithium cells also comprise lithium ion accumulators, which comprise anodes and cathodes that can intercalate and deintercalate lithium ions, and lithium accumulators, which comprise anodes comprising metallic lithium.

Lithium cells comprise an electrolyte which is arranged within/between two different electrodes, the anode and the cathode, energy being stored electrochemically by transformation of chemical energy into electrical energy. The medium between the two electrodes must fulfill at least two functions. One function is that of accommodating the electrolyte while simultaneously ensuring lithium ion conduction within the electrode and between the anode (negative electrode) and cathode (positive electrode). The further function is that of insulating the two electrodes from one another electrically and mechanically to prevent electrical shorts.

Polymer membranes, for example based on polyethylene (PE), are often employed as so-called separators which are both permeable to the ions of the electrolyte solution and also insulate electrodes from one another electrically and mechanically. While these separators are cheap they exhibit only low thermal and mechanical stability, said separators being deformed above 90° C. and melting/areal shrinking of the polymer membrane already sating in above 130° C. In particular these polymer membranes can also be penetrated by lithium dendrites, for example, which can grow on the anode side during operation of the lithium cells. Furthermore, on account of their low polarity the polyethylene membranes can undergo only poor wetting by the polar, nonaqueous electrolyte solutions of the lithium cells.

DE 36 03 196 A1 discloses a process for producing a lead accumulator comprising a gel electrolyte. In contrast to lithium cells, in lead accumulators, energy is stored through chemical transformations of the electrodes and of the electrolyte. To produce this gel electrolyte a certain amount of fiber material, for example polyethylene or polypropylene is admixed, together with the accumulator acid, sulfuric acid, to a sol-gel batch made of silicic acid and introduced into the cell of the lead accumulator. After gelation, an electrolyte gel is formed that is reinforced by the fibers present therein. The disadvantage of this system is that in principle it cannot be employed for lithium cells inter alia because of the acidic, aqueous electrolyte. Furthermore, silicic acid is also not suitable as a gelating agent for lithium cells since silicic acid does not undergo physical and chemical interaction with liquid electrolytes. Silicic acid is highly hygroscopic and difficult to dry and would introduce moisture/water into a lithium cell which negatively affects service life and performance.

The invention is based on the object of providing a lithium cell that is improved with regard to the above mentioned disadvantages. The invention provides a lithium cell, for example a lithium ion accumulator. The invention also provides batteries comprising the lithium cells and motor vehicles or mobile devices/stationary storage means comprising the batteries.

SUMMARY OF THE INVENTION

In one embodiment, the invention provides a lithium cell comprising an anode; a cathode; and an electrolyte gel which is located at least between the anode and the cathode, comprising a lithium ion conducting salt solution, wherein the electrolyte gel comprises fibers that are wettable by the lithium ion conducting salt solution and have a surface tension of at least 30 mN/m.

The advantage of the lithium cell according to the invention is that the constituted electrolyte gel comprising the fibers wettable by the lithium ion conducting salt solution has greater mechanical stability than conventional electrolyte gels and in addition, on account of its high viscosity, simultaneously strongly reduces, or can completely prevent, the growth of lithium dendrites from the anode.

At the same time the electrolyte gel reinforced by the fibers makes certain that the anode and the cathode are electrically separated from one another while the lithium ion conductivity between the two electrodes is still ensured.

The fibers wettable by the lithium ion conducting salt solution are polar fibers having a high surface tension of at least 30 mN/m, preferably, at least 36 mN/m or 39 mN/m. The good wettability of the fibers makes certain that the electrolyte gel can form around the fibers in uniform fashion so that in particular after gelation a homogeneous electrolyte gel reinforced with fibers is present.

The surface tension of the fibers which is a measure of the polarity of the fibers may be measured, for example, by producing rectangular plates from the plastics materials of the fibers and determining their surface tension in accordance with German Industrial Standard DIN ISO 8296, with appropriate test inks.

The electrolyte gel reinforced by the fibers simultaneously exhibits high melting temperatures of >200° C. and high operating temperatures can therefore be realized with the lithium cells according to the invention. Furthermore, on account of the electrochemical stability of the fibers comprising, for example, polyimide or aramid and the fiber-reinforcement resulting therefrom, lithium cells comprising the gel electrolytes according to the invention are also suitable for high-voltage applications at high potentials of, for example, about 5V.

The fibers may be mixed into the electrolyte gel using, for example, a high shear mixer, for example, at 2000 rpm to 3000 rpm. The fibers may furthermore be mixed with the electrolyte gel in a ball mill.

According to one aspect of the invention, suitable fibers for the electrolyte gel that may be employed include polymer fibers or glass fibers.

The polymer fibers may be selected, for example, from plastics materials and biopolymers and combinations thereof.

As used herein, the term "biopolymers" is to be understood as meaning naturally occurring polymers synthesized by cells, and polymers that may be formed from biopolymers by derivatization. These biopolymers are polar polymers which exhibit high surface tensions and can therefore be particularly well wetted by the nonaqueous, polar ion conducting salt solutions of the lithium ion accumulators.

The biopolymers may in particular be selected from cellulose, polylactide (polylactic acid), polyhydroxybutyrate, chitin and starch and also any desired combinations thereof. All of these biopolymers have very high surface tensions.

Derivatives of biopolymers that may be employed include, for example, so-called regenerated fibers which are produced from renewable raw materials, especially from cellulose. These biopolymers may be, for example, viscose, derived from pure cellulose, modal, produced by a modified viscose process, lyocell, produced by a wet spinning process, wherein N-methylmorpholine N-oxide monohydrate is used as the solvent, and also cupro, produced by the copper oxide-ammonia process.

Further derivatives of biopolymers are acetate fibers (cellulose acetate). These are spun in a dry spinning process from cellulose acetate dissolved in acetone.

As used herein, the term "plastics materials" as opposed to "biopolymers" is to be understood as meaning synthetically manufactured polymers which accordingly do not occur in nature. According to the invention, plastics materials having a surface tension of at least 30 mN/m, preferably, at least 36 mN/m, are employed. These accordingly have a high polarity and can be well wetted by the lithium ion conducting salt solutions.

Plastics materials having a high polarity that may be employed include, for example, polyamides, polyimides, polyesters and also any combinations thereof.

The polyamides (PA) may include, for example, aromatic polyamides (aramids), such as polyparaphenylene phthalamides (PPTA), and aliphatic polyamides. The polyesters may include, for example, polyethylene terephthalate (PET) or polyethylene naphthalate (PEN). In particular, the aramids exhibit high thermal, mechanical and electrochemical stability which accordingly has a positive effect on the electrolyte gel reinforced with the fibers.

In another embodiment of the invention, the electrolyte gel may further comprise a gel matrix with a nonaqueous, polar lithium ion conducting salt solution present in the gel matrix.

The gel matrix may in particular comprise a polymer that swells up on contact with the nonaqueous lithium ion conducting salt solution. This polymer may include, for example, polyethylene oxide (PEO), polyvinylidene fluoride (PVDE), polyvinylidene fluoride-co-hexafluoropropene (PVDF-HFP) and any combinations thereof. Such polymers can particularly easily form, together with the nonaqueous, polar lithium ion conducting salt solution, an electrolyte gel which ensures good electrical separation of the anode and the cathode coupled with high ion conductivity since the lithium ion conductivity is determined by the liquid component. Furthermore, these are alternatively or in addition a gel electrolyte which may be formed by polymerizing polymerizable monomers comprising unsaturated groups such as C=C double bonds) together with a nonaqueous, polar solvent and a lithium ion conducting salt. For example, acrylates, such as triethylene glycol diacrylate and trimethylolpropane triacrylate, may be reacted, as the unsaturated polymerizable monomers, with a free-radical initiator such as tert-butylperoxy pivalate.

The proportion of the fibers in the electrolyte gel may be between 0.05 wt % and 70 wt %, preferably between 0.1 wt % and 50 wt %, more preferably between 1 wt % and 10 wt %. Such proportions of the fibers in the electrolyte gel make certain that a high-viscosity, mechanically stable electrolyte gel is formed.

According to another aspect of the invention, the length of the fibers is between 0.01 mm and 3 mm, preferably between 0.1 and 2 mm, more preferably between 0.02 and 1 mm. Such fiber lengths make certain that on the one hand the fibers bring about mechanical stabilization in a gel matrix while on the other hand gelation is not excessively impeded.

In a lithium ion accumulator, the cathode comprises, for example, a lithiated transition metal oxide (such as cobalt or nickel) or lithiated olivines or a lithiated spinel. The cathode may include, for example, $LiCoO_2$, $LiNiO_2$, $Li(Ni,Co)O_2$ (NCA), $Li(NiCoMn)O_2$ (NCM), $LiFePO_4$ or $LiMn_2O_4$. The anode may in particular comprise materials that can intercalate and deintercalate lithium ions particularly easily, for example, graphite or monocrystalline, amorphous silicon, or the anode may also comprise or consist of lithium metal itself. Lithium ion accumulators according to the invention may in particular also be used with so-called high-voltage spinets for nominal voltages of about 4.6 V, such as using $LiMn_{1.5}Ni_{0.5}O_4$ or $LiMn_{1.5}Ni_{0.42}M_{0.08}O_4$ (M=Cr, Fe, and Ga) as the cathode material. It is also possible to employ so-called overlithiated oxides, for example, $Li_{1.17}Ni_{0.17}Co_{0.1}Mn_{0.56}O_2$, as active materials having a specific capacity of about 270 Ah/g.

On account of the high mechanical stability of the inventive electrolyte gel comprising the fibers, the anode may also be composed of lithium metal itself or comprises lithium metal since the electrolyte gel reinforced with the Fibers effectively counters the formation of lithium dendrites.

Electrolyte solutions that may be used include, for example, lithium ion conducting salts such as lithium hexafluorophosphate $LiPF_6$, lithium tetrafluoroborate and solvents that may be used include aprotic, polar nonaqueous solvents, for example, ethylene carbonate, propylene carbonate, dimethyl carbonate, or diethyl carbonate.

Nonflammable electrolyte gels in the lithium ion accumulators according to the invention may be achieved via electrolyte gels based on ionic liquids. For example, an ionic solution can be generated by dissolving lithium bis(trifluoromethanesulfonyl)imide $Li^+$ $[F_3C-(SO_2)-N-(SO_2)-CF_3]^-$ in 1-methyl-1-propylpiperidinium bis(fluorosulfonyl)imide or 1-butyl-1-methylpyrrolidinium bis(trifluoromethanesulfonyl)imide. Polymerization of the above described acrylates or other polymerizable compounds such as poly(ethylene glycol)dimethacrylate and vinylene carbonate with free-radical initiators in the presence of the ionic solutions can then form the nonflammable electrolyte gels based on the ionic liquids.

The present invention also provides batteries comprising at least two lithium cells according to the invention, wherein the two lithium cells are electrically connected to one another. This may be achieved, for example, by an electrical connection in parallel or series.

Due to their high power densities, such batteries may be advantageously employed in, for example, motor vehicles, such as electric cars, or in mobile devices, for example mobile end-user devices, for example notebooks, mobile phones or tablet PCs in the consumer sector. Furthermore, batteries and lithium cells according to the invention may also be used in stationary storage means.

Other objects, advantages and novel features of the present invention will become apparent from the following detailed description of one or more preferred embodiments when considered in conjunction with the accompanying drawings.

BRIEF DESCRIPTION OF THE DRAWINGS

A working example of a lithium ion accumulator is more particularly elucidated herein below with reference to FIG. 1.

DETAILED DESCRIPTION OF THE INVENTION

FIG. 1 is a schematic diagram of a lithium-ion accumulator 1 comprising an anode 2 and a cathode 3 located opposite thereto. Arranged between the electrodes is an electrolyte gel 4, in which fibers 6 and 7 are present. The electrolyte gel simultaneously also comprises a nonaqueous, aprotic and polar electrolyte solution 8 and thus provides an ionic connection between both electrodes 2 and 3. For clarity, the gel matrix of the electrolyte gel is not shown.

The fibers present in the electrolyte gel may for example be homogeneously dispersed in the electrolyte gel and may be composed of only a single fiber, for example, a polymer fiber, such as polyamide, polyimide or polyester, or may also comprise a mixture of different fibers. It is thus possible for example, for cost reasons, to employ less costly fibers made of biopolymers, such as for example cellulose, in addition to more costly polar plastics material fibers, such as for example polyimide fibers. The advantage of this is that, while such fiber-reinforced electrolyte gels are less costly than gels comprising polar plastics materials, the biopolymers are nevertheless well wetted on account of their high polarity and thus contribute well to the mechanical reinforcement of the electrolyte gel.

It is particularly advantageous when the individual fibers are not covalently or firmly bonded to one another but rather are merely homogeneously compounded/dispersed in the electrolyte gel as individual fibers.

A lithium ion accumulator of this type exhibits enhanced mechanical and thermal stability on account of the electrolyte gel comprising the fibers of the invention. The good wettability of the polar fibers with the components of the electrolyte gel results in a particularly homogeneous dispersal of the fibers in the electrolyte gel. The lithium ion accumulator thus also exhibits electrical parameters that are improved compared to accumulators which comprise merely a conventional electrolyte gel or comprise the conventional membrane separators, for example those based on polyethylene or polypropylene.

The invention is not restricted by the description with reference to the working examples. On the contrary, the invention comprises every novel feature and also every combination of features, which more particularly includes every combination of features in the claims, even if this feature or this combination itself is not explicitly indicated in the claims or working examples.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lithium cell comprising:
   an anode;
   a cathode; and
   an electrolyte gel which is located at least between the anode and the cathode, comprising a lithium ion conducting salt solution,
   wherein the electrolyte gel comprises fibers that are wettable by the lithium ion conducting salt solution,
   wherein the fibers have a surface tension of at least 30 mN/m and the fibers are homogeneously dispersed in the electrolyte gel so that the electrolyte gel forms around the fibers in uniform fashion,
   wherein the length of the fibers is between 0.01 mm and 3 mm, and
   wherein individual fibers present in the electrolyte gel are not connected to one another, and wherein the amounts of the fibers present in the electrolyte gel is between 0.1 wt % and 50 wt %.

2. The lithium cell according to claim 1, wherein the fibers comprise polymer fibers and/or glass fibers.

3. The lithium cell according to claim 2, wherein the polymer fibers are selected from plastics materials, biopolymers and combinations thereof.

4. The lithium cell according to claim 2, wherein the polymer fibers have a surface tension of at least 39 mN/m.

5. The lithium cell according to claim 2, wherein the polymer fibers are selected from the group consisting of: cellulose, polylactide, polyhydroxybutyrate, chitin, starch, polyamide, polyester, polyimide and combinations thereof.

6. The lithium cell according to claim 1, wherein the electrolyte gel further comprises a gel matrix, wherein the lithium ion conducting salt solution is present in the gel matrix.

7. The lithium cell according to claim 6, wherein the gel matrix comprises a polymer that swells up on contact with the lithium ion conducting salt solution.

8. The lithium cell according to claim 7, wherein the polymer is selected from the group consisting of polyethylene oxide (PEO), polyvinylidene fluoride (PVDF), polyvinylidene fluoride-co-hexafluoropropene (PVDF-HFP) and combinations thereof.

9. The lithium cell according to claim 1, wherein the lithium ion conducting salt solution comprises a lithium ion conducting salt and a nonaqueous, polar solvent.

10. The lithium cell according to claim 1, wherein the length of the fibers is between 0.1 mm and 2 mm.

11. The lithium cell according to claim 1, wherein the lithium cell is in the form of a lithium ion accumulator, and wherein the anode comprises a material which can intercalate and deintercalate lithium ions and the cathode comprises a lithiated metal oxide.

12. The lithium cell according to claim 11, wherein the anode comprises a lithium metal.

13. A battery comprising at least two lithium cells of claim 1, wherein the two lithium cells are electrically connected to one another.

14. A motor vehicle comprising a battery as claimed in claim 13.

15. A mobile device or stationary energy storage means comprising a battery as claimed in claim 13.

* * * * *